UNITED STATES PATENT OFFICE.

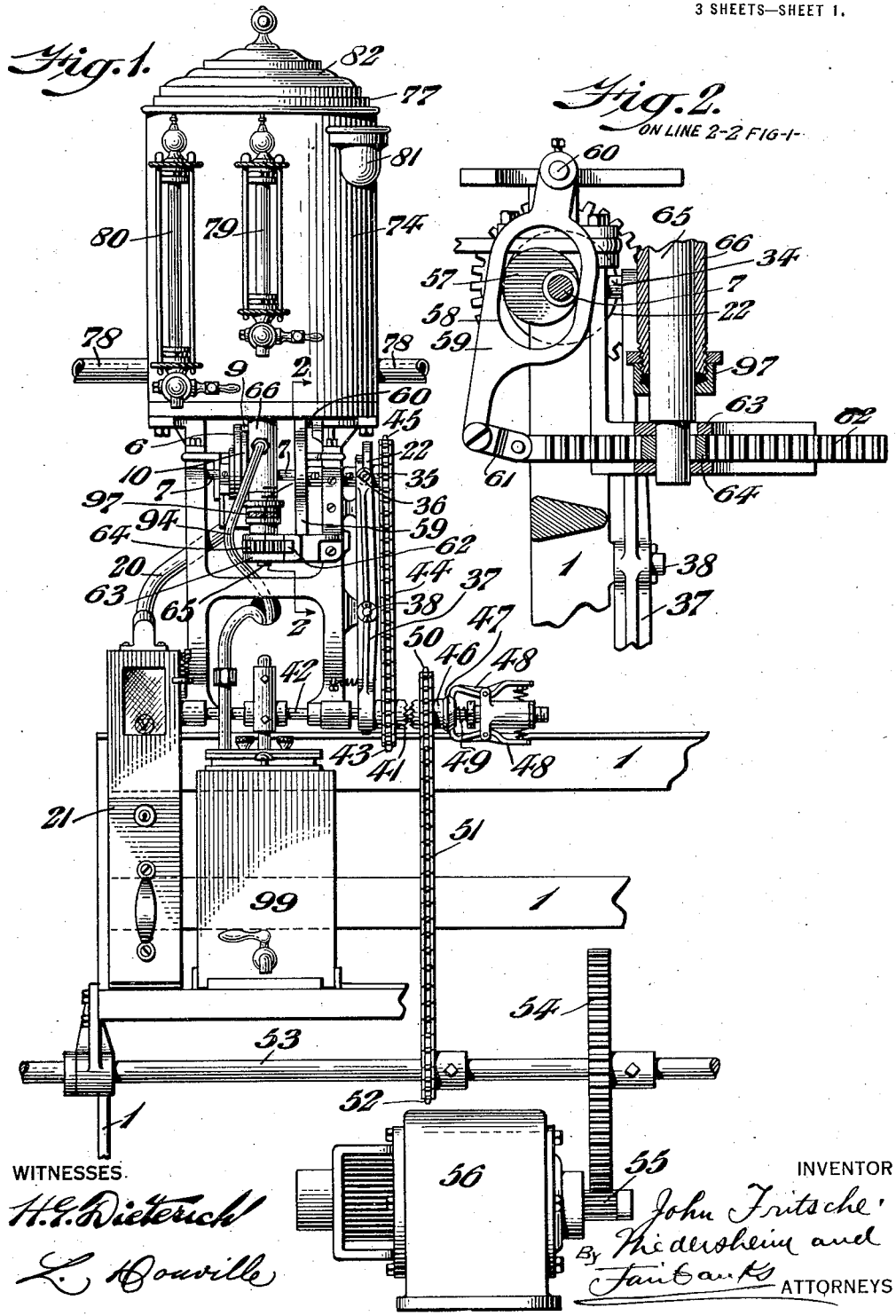

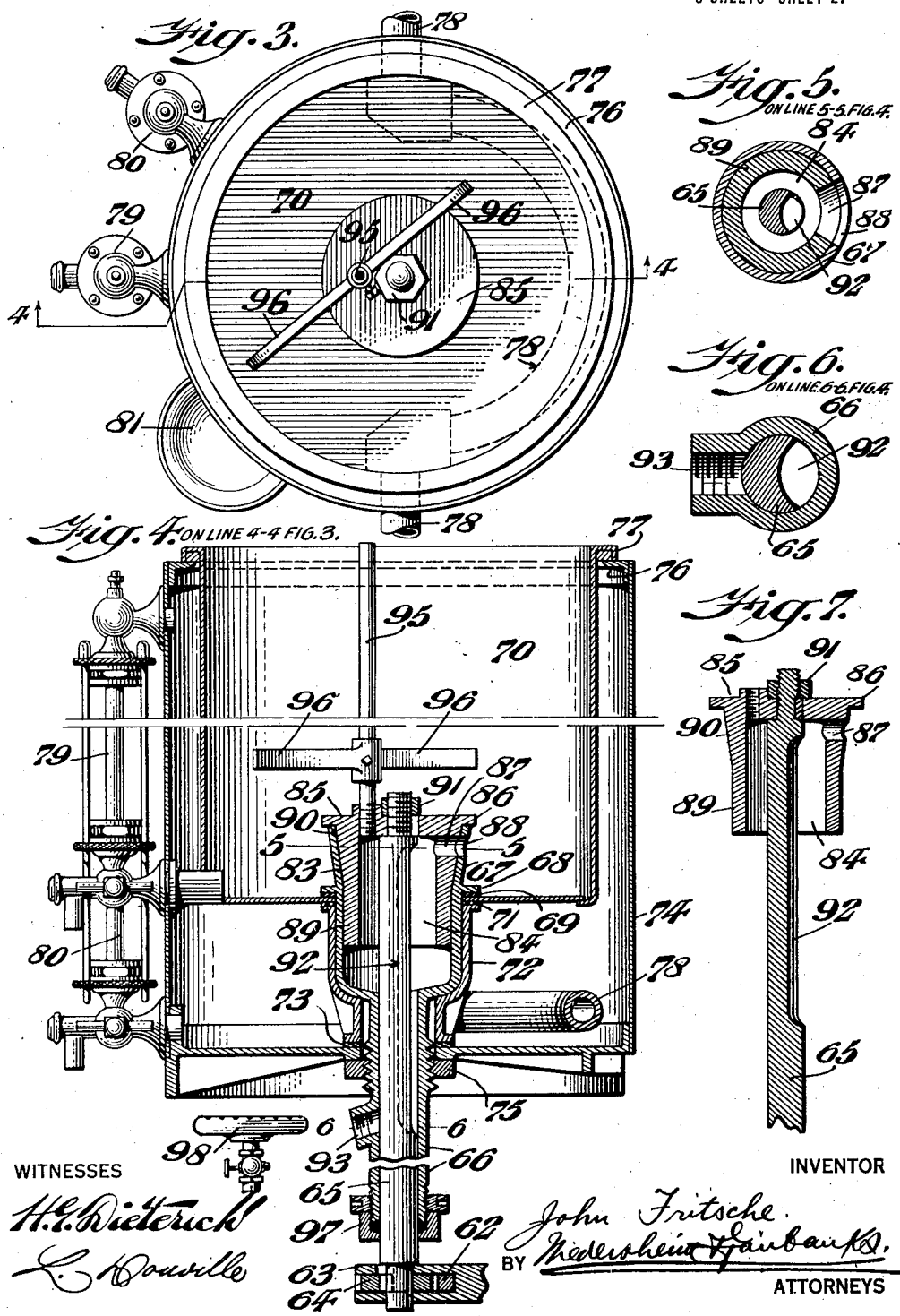

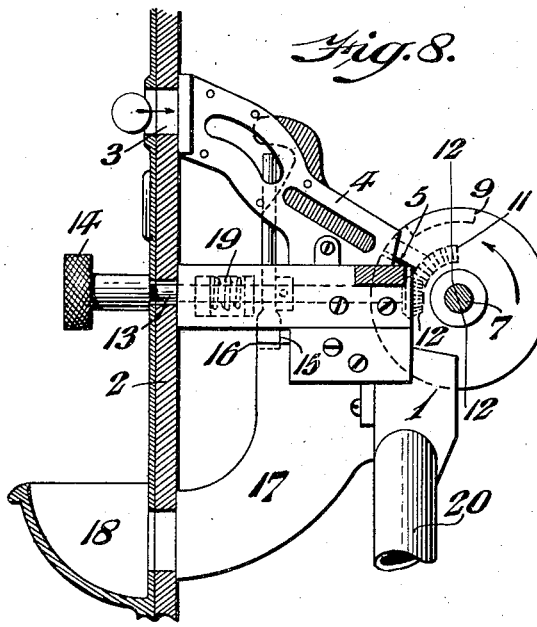
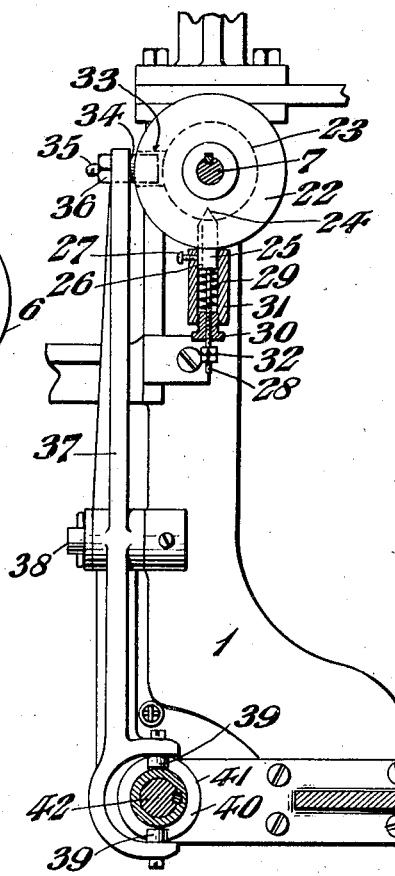
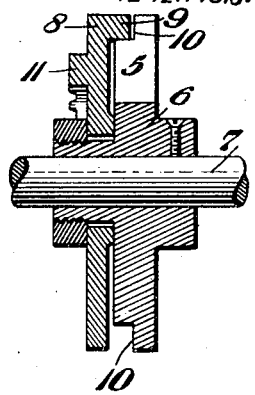
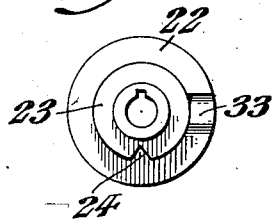
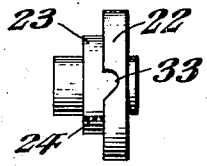

JOHN FRITSCHE, OF PHILADELPHIA, PENNSYLVANIA, ASSIGNOR, BY DIRECT AND MESNE ASSIGNMENTS, TO HORN & HARDART COMPANY, A CORPORATION OF NEW YORK.

APPARATUS FOR DISPENSING LIQUIDS.

1,356,816.  Specification of Letters Patent.  Patented Oct. 26, 1920.

Original application filed November 30, 1914, Serial No. 874,646. Divided and this application filed August 24, 1916. Serial No. 116,578.

*To all whom it may concern:*

Be it known that I, JOHN FRITSCHE, a citizen of the United States, residing in the city and county of Philadelphia, State of Pennsylvania, have invented a new and useful Apparatus for Dispensing Liquids, of which the following is a specification.

In my prior Patent, No. 1,199,065, dated September 26th, 1916, of which the present application is a division, I have described and broadly claimed, a novel construction for vending a plurality of liquids, and my present invention relates more particularly to a novel construction of a measuring device, whereby a predetermined amount of liquid is dispensed at each cycle of the operation.

It further consists of a novel construction and arrangement of a measuring cup or receptacle and novel means for controlling the admission of liquid from the main receptacle to said measuring cup and its discharge therefrom.

It further consists of a novel construction and arrangement of a double wall container, whereby the liquid to be vended may be maintained at a desired temperature, and novel means for controlling the discharge of liquid from the apparatus.

Other novel features of construction and arrangements will hereinafter more clearly appear in the detailed description of my invention.

For the purpose of illustrating one manner of carrying out my invention in practice, I have shown in the accompanying drawings, a typical embodiment of the invention which has been found in practice to give satisfactory and reliable results, but it is, of course, to be understood that this embodiment is typical only and that the various instrumentalities of which my invention consists can be variously arranged and organized and that it is not limited to the precise arrangement and organization of these instrumentalities as herein set forth.

Figure 1 represents a rear elevation of an apparatus for dispensing liquids embodying my invention.

Fig. 2 represents a sectional elevation on line 2—2 of Fig. 1.

Fig. 3 represents a top plan view of the liquid container, the cover having been removed for the sake of clearness of illustration.

Fig. 4 represents a sectional elevation, the section being taken on line 4—4 of Fig. 3.

Fig. 5 represents a section on line 5—5 of Fig. 4.

Fig. 6 represents a section on line 6—6 of Fig. 4.

Fig. 7 represents a sectional elevation of the valve and a portion of the valve stem.

Fig. 8 represents a sectional view of a portion of the machine, showing more particularly the coin mechanism and certain of its adjuncts.

Fig. 9 represents a section on line 9—9 of Fig. 1.

Fig. 10 represents an end elevation of a cam employed.

Fig. 11 represents a side elevation of the cam seen in Fig. 10.

Fig. 12 represents a section on line 12—12 of Fig. 8.

Similar numerals of reference indicate corresponding parts in the figures.

Referring to the drawings:—

1 designates the frame-work of the apparatus, the form and contour of which may be varied widely in practice. To this frame-work is secured in any desired manner, a front wall 2, (see Fig. 8), to which the coin or check-controlled mechanism is connected.

*The coin-controlled mechanism.*

Any desired or conventional type of coin-controlling mechanism may be employed, but for convenience of illustration, I have shown the same mechanism as that disclosed in my co-pending application to which reference has hereinbefore been made. The front wall 2 of the housing of the apparatus is provided with an opening 3 into which the coin or check is inserted, and such inlet registers with a coin chute 4, through which the coin will pass if it is of the proper dimensions, and fall into the inclined slot 5 of a coin wheel 6, which is fixed to a shaft 7, which latter is journaled in the frame-work of the machine in any desired manner.

8 designates a disk loosely mounted on the hub of the coin wheel 6, see Fig. 12, and this disk 8 is provided with a lug 9 which travels in a recessed portion 10 of the coin wheel 6 so as to engage a coin which has been retained in the slot 5 of the coin wheel. The disk 8 is provided with a segmental rack 11, which is in mesh with a pinion 12 carried by a rotatable shaft 13 which extends through the front plate 2 of the machine housing and is provided with a grasping portion 14. The shaft or rod 13 is provided with a foot-piece 15 which normally rests on a shoulder 16 to a stationary portion of the frame-work, such as for example, the coin return chute 17 which delivers the rejected coin to a receptacle 18 located exterior of the machine.

19 designates a spring, one end of which is fixed to the rod 13 and the other end of which is connected to a stationary portion of the machine so that the rod 13 normally remains in the position seen in Fig. 8.

The coin which has served to interlock the coin-wheel 6 and the disk 8 passes into the conduit 20 on the rotation of the coin wheel and disk and is received in a coin receptacle 21 of any desired type and preferably one which is removable and which can be locked in position.

Referring now more particularly to Figs. 9, 10 and 11, it will be seen that the shaft 7 has keyed or otherwise fixed thereon a cam member 22 which is provided with a boss or bearing member 23 having a slot 24 in its periphery, which is illustrated as having a V-shape contour and which is adapted to interlock with a plunger 25. This plunger 25 has a longitudinal slot 26 in its periphery, into which extends a set screw 27 to prevent rotation of the plunger 25. The plunger 25 is also provided with a stem 28 and a spring 29 is interposed between the plunger and a nut 30 which closes the lower end of the sleeve 31, in which latter, the plunger is slidably mounted.

32 designates nuts on the plunger stem 28, one of which serves as a lock nut. The cam member 22 is provided on one of its sides with a cam-shaped recess 33 which normally receives an anti-friction roller 34 carried by a pin 35 which is secured by means of a nut 36 to a lever 37, which is fulcrumed at 38 to the frame of the machine. The lower end of the lever 37 is bifurcated and provided with oppositely disposed anti-friction rollers 39 secured thereto in a similar manner to that already described with reference to the roller 34. These anti-friction rollers 39 travel in a groove 40 of a clutch member 41, which is keyed to a shaft 42 journaled in the frame-work of a machine. The clutch member 41 carries a sprocket wheel 43, around which passes a sprocket chain 44. Said sprocket chain also passes around the sprocket wheel 45 fixed on the shaft 7.

46 designates a clutch member loosely mounted on the shaft 42 and whose movement toward the clutch member 41 which is keyed to the shaft is limited, as will be understood by reference to my prior patent, to which I have heretofore referred. The clutch member 46 is provided with a disk 47 having reversely inclined faces at its periphery, with which spring clips 48 are adapted to engage.

49 designates a spring which tends to move the clutch member 46 toward its abutment on the shaft 42. 50 designates a sprocket wheel carried by the coupling member 46, and coöperating with this sprocket wheel 50 is a sprocket chain 51 which passes around the sprocket wheel 52 mounted on a shaft 53 journaled in the frame-work of the machine. 54 designates a gear on the shaft 53, which meshes with a pinion 55 on the drive shaft of an electric or other motor 56.

Referring now more particularly to Fig. 2, the shaft 7 has secured thereto in any desired manner, a cam or eccentric 57, which is located in the recess 58 of a lever 59, which is pivoted at 60 to a fixed portion of the framework. The opposite end of the lever 59 is connected with a link 61, which in turn is connected with a rack-bar 62 mounted to reciprocate in a guide 63. The rack-bar 62 meshes with a pinion 64 which is keyed to the reduced end of a valve-stem 65 which is journaled in a sleeve 66 of a measuring cup 67. The measuring cup 67 is provided with a flange 68 and a gasket 69, which rests on the bottom of a liquid container 70. The bottom of the liquid container 70 rests upon a gasket 71 which is supported upon a tubular casing 72, which is inwardly deflected at its lower end to support the measuring cup 67 and the bottom of said casing 72 rests on a gasket 73 which is seated on the bottom of an outer liquid container 74.

75 designates a nut in threaded engagement with the sleeve 66 and adapted to bear against the bottom of the outer liquid container 74 in order to maintain the measuring cup in sealed condition with respect to the inner and outer liquid containers. The outer liquid container 74 is provided with an inwardly extending flange 76 upon which the downwardly deflected portion 77 of the inner liquid container 70 is seated. The liquid, such as for example, water, in the outer container 74, is maintained at a desired temperature by passing hot water, steam, or other temperature changing medium through the conduit 78 which passes through the chamber of the outer container 74.

79 designates a liquid gage (see Fig. 1) for the inner container 70, and 80 designates a similar gage for the outer liquid container 74, and each of these gages are provided with a drain cock, as will be understood by reference to Fig. 1.

81 designates a spout through which the outer container may be filled without removing the cover 82. The inner wall of the measuring cup 67 at its upper end forms a valve seat 83 for a valve 84, which is illustrated as consisting of a cup-shaped valve having a closed top 85, which is provided with a flange 86 which rests on the top of the measuring cup 67. 87 designates a port in the side wall of the valve 84 which is adapted to register on its rotation with a port 88 in the form of a slot in the measuring cup 67, which communicates with the inner container 70. The lower portion of the valve 84 has a cylindrical contour, as at 89, while its upper portion has a conical wall 90, said walls coöperating with seats of corresponding contour in the measuring cup. The valve-stem 65 has a reduced end which is keyed to the top of the valve 84 and such valve stem is fixed in position by means of a nut 91 bearing against the top of the valve and in threaded engagement with the valve-stem. The valve-stem is longitudinally grooved, as at 92, see Figs. 4 and 7, so that upon a partial rotation of the valve stem, a discharge port 93 will be placed in communication with the chamber of the measuring cup and the liquid to be vended will flow by gravity through the discharge conduit 94, which conducts the liquid to a point accessible to the purchaser. With some liquids, such as for example, chocolate or milk, it is desirable to frequently agitate the liquid, and I therefore eccentrically connect with the valve, a rod 95 having a desired number of agitator bars 96 of any desired contour, which are adjustably mounted on said rod. The lower end of the sleeve 66 is provided with a stuffing-box 97 of any desired type.

The operation of my invention will now be apparent to those skilled in this art and is as follows:

The intending purchaser inserts a coin of the proper denomination in the coin slot 3 and the coin passes through the chute 4 into the coin slot 5 in the coin wheel 6. The intending purchaser then turns the handle 14 in the proper direction and the pinion 12 meshing with the rack 11 will cause the disk 8 to rotate, and the lug 9 pressing against the slot 5 in the coin wheel will cause the disk 8 and the coin wheel 6 to be interlocked and effect a partial rotation of the shaft 7. This causes the spring-pressed plunger 25 to move out of the groove 24, and the roller 34 will move out of the recess 33 and will travel on the side of the cam. This action causes the lever 37 to be rocked on its fulcrum, and the clutch member 41 keyed on the shaft 42 will be moved into engagement with the continuously rotating clutch member 46. Owing to the provision of the sprocket wheels 50 and 52, and the sprocket chain 51 and the shaft 53 operatively connected with the motor, the shaft 7 will be rotated one revolution, whereupon the roller 34 will again enter the cam recess 33, thereby rocking the lever 37 and disengaging the clutch members. The spring-pressed plunger 25 will interlock with the recess 24, and the shaft 7 will be retained in its normal position. If for any reason the parts should jam, the machine is rendered fool proof and any damage to the machine prevented, owing to the resilient mounting of the clutch member 46.

The clutch member 46 will be moved outwardly and the spring-actuated clips 48 will engage the inner of the inclined walls of the disk 47 and hold the clutch member 46 out of its clutch engaging position. The rotation of the shaft 7, as above described, rotates the cam 57, thereby reciprocating the rack 62, and as this rack meshes with the pinion 64, the valve-stem 65 and the valve 84 will be partially rotated. This causes the inlet port 87 of the valve to move out of register with the port 88, and the groove 92 will be brought into register with the discharge port 93 so that the liquid will pass by gravity through the delivery conduit 94. The valve is returned to its initial position, and the ports 87 and 88 are again brought into register, and the measuring cup is again filled with liquid during the next delivery operation.

It will be apparent that the amount of liquid which is discharged from the inner container 70 may be varied by either changing the measuring cup and substituting for it a measuring cup of larger dimensions or by varying the dimensions of the valve to vary the amount of liquid which the measuring cup will contain. The valve of the measuring device for the inner liquid container is preferably timed in such a manner that the measuring cup is empty at the beginning of the operation and is filled after a predetermined rotation of the valve stem which causes the ports 87 and 88 to be brought into register. If desired, a burner 98 may be employed to heat the liquid in the outer container 74.

It will be understood that in practice I preferably employ a continuously rotating shaft 53, and while I have illustrated but a single unit, a number of these units are employed which are driven by this continuously rotating shaft, and independently actuated by the insertion of a coin or check into the machine of proper denomination. I have shown in Fig. 1 the shaft 42 as adapted to control a second liquid container 99, but as this second liquid container forms *per se* no part of my present invention, I have deemed it unnecessary to illustrate and describe the same in detail.

It will now be apparent that I have devised a novel and useful apparatus for dispensing liquids, which embodies the features of advantage enumerated as desirable in the statement of the invention and the above description, and while I have, in the present instance, shown and described a typical embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a vending machine, an outer container, an inner container spaced therefrom, a measuring cup having an inlet port communicating with the inner container and having a discharge port, an inverted cup-shaped valve closing an end of said measuring cup and controlling the inlet port, a valve stem connected with said valve and having a groove always in communication with said cup and adapted to be brought into register with said discharge port, and means to actuate said valve stem.

2. A vending apparatus, comprising a liquid container, a measuring cup having an inlet port communicating with the container, an inverted cup-shaped valve having a port to register with said inlet port, a valve stem connected with said valve, and provided with means to control the discharge from said cup, a pinion on said valve stem, a rack meshing with said pinion, and means to actuate said rack.

3. In a vending machine, a liquid container, a measuring cup having an inlet port communicating with the container and having a discharge port, a valve forming a closure for said measuring cup and rotatably carried by it and having a port to register with said inlet port, a valve stem connected with said valve and having an external passage to register with said discharge port, and means to actuate said valve stem to control the flow of liquid into and from said measuring cup.

4. In a vending machine, a double walled container, a temperature changing medium between the walls of said container, a measuring cup having an inlet port communicating with said container and having a sleeve provided with a discharge port, a valve controlling said inlet port, a valve stem journaled in said sleeve and connected with said valve and controlling said discharge port, and means to actuate said valve stem.

5. In a vending machine, a container for the liquid, a measuring cup having an inlet port communicating with the container and provided with a cylindrical wall which merges into an outwardly converging wall, a valve having its outer periphery adapted to engage said wall and controlling said inlet port, a valve stem connected with said valve and having a groove in its side extending into proximity to said discharge port, and means to rotate said valve stem to cause the valve to open or close the inlet port and to cause the valve stem to open or close the discharge port.

6. In a vending machine, a container for the liquid, a measuring cup having an inlet port communicating with the container, a valve closing the upper end of the measuring cup and controlling said inlet port, an agitating device eccentrically carried by said valve and located in said container, a valve stem connected with said valve and controlling said discharge port, and means to impart a partial rotation to said valve stem.

7. In a vending machine, a liquid container, a measuring cup having an inlet port communicating with the container and having a discharge port, a valve controlling said inlet port, a valve stem connected with said valve, a lever operatively connected with said valve stem and provided with a recess, a cam located in said recess, and means to actuate said cam to impart movement to said lever and thereby to said valve stem.

8. In a vending apparatus, a liquid delivery mechanism comprising the following instrumentalities:—an inner container for the liquid to be vended, an outer container, means to introduce a temperature changing medium into said outer container, a measuring cup having a port communicating with the inner container, a valve having a port registering at predetermined times with the measuring cup port, a valve stem for said valve having a groove, and a discharge conduit communicating with said groove on the actuation of said valve stem.

9. In a vending machine, a liquid container, a measuring cup having a sleeve extending exterior of said container and having a port communicating with said container, said sleeve having a discharge port, a valve controlling the port communicating with the container, a stem carried by said valve and controlling said discharge port, and means to actuate said valve stem to effect the discharge of a measured quantity of liquid from said liquid container.

10. In a vending machine, an outer container, an inner container, a casing spacing the bottoms of said containers from each other, a measuring cup, having an inlet port communicating with the inner container, and provided with a sleeve extending through the outer container, said sleeve having a discharge port, a valve controlling said inlet port, a valve stem carried by said valve and controlling said discharge port, and means to actuate said valve stem.

11. In a vending machine, an inner liquid container, an outer liquid container, a casing spacing the bottom of said containers from each other, a measuring cup seated within said casing, extending through said containers, and having a flange to engage the inner container, a fastening device engaging said outer container and said measuring cup to maintain said casing in sealed condition around the measuring cup, a valve controlling said inlet port, said measuring cup having a discharge port, and means to control said discharge port and to actuate said valve.

12. In a vending machine, a liquid container, an open-ended measuring cup extending thereinto and provided with an inlet port communicating with said container and a discharge port, a valve closing the open end of said measuring cup and rotatable thereon and provided with a port to register with said inlet port, a stem carried by said valve and having a groove adapted to be brought into register with said discharge port to control the discharge from said measuring cup, an agitating device carried by said valve, and means to effect the rotation of said valve.

JOHN FRITSCHE.

Witnesses:
H. S. FAIRBANKS,
C. D. McVAY.